Patented Dec. 20, 1932

1,891,363

UNITED STATES PATENT OFFICE

OTTO RÖHM, OF DARMSTADT, GERMANY

EGG YOLK SUBSTITUTE FOR TANNING

No Drawing. Application filed November 4, 1929, Serial No. 404,866, and in Germany December 6, 1928.

My invention has for its purpose to produce an egg yolk substitute. I have made the discovery that one or more esters formed of bivalent or polyvalent alcohols and phosphoric acid, especially glycerin phosphoric acid, or salts of such esters, when united with an ordinary oil emulsion result in a good egg yolk substitute for the manufacture of kid leather.

One may, for example, proceed in this way that as referred to the weight of the hides, one uses 10% of a tanning agent composed as follows:

20 parts of oil, 5.0 parts of sodium glycerin phosphate, 2.0 parts of gum-arabic and 73.0 parts of water.

This tanning agent is used together with 10% flour, 6% alum, 3% sodium chloride and 40% water, each as referred to the weight of the hides.

The constituents of this new egg yolk substitute can be added to the tanning process either separately, or together.

The oil emulsion can be made by stirring or other well-known methods either alone from oils and water, or additional substances, i. e. emulsifiers—methyl cellulose has been found to be well adapted—can also be used. In some cases it is advisable to use in addition to emulsifiers other well-known substances for the various purposes.

I claim:

1. A fatty product for use in the manufacture of kid leather, comprising an ordinary oil emulsion and an admixture of a salt of glycerine phosphoric acid.

2. A fatty product for use in the manufacture of kid leather, comprising an ordinary oil emulsion and an admixture of sodium glycerine phosphate.

In testimony whereof I affix my signature.

OTTO RÖHM.